United States Patent
Holland et al.

(10) Patent No.: US 10,656,771 B2
(45) Date of Patent: May 19, 2020

(54) METHOD AND APPARATUS FOR MULTI CONFIGURATION TUNING FOR MAGNET TO ELECTROMAGNETIC RESONANCE PANEL PROXIMITY

(71) Applicant: Dell Products, LP, Round Rock, TX (US)

(72) Inventors: Sacha B. Holland, Campbell, CA (US); Aida I. Suarez, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 96 days.

(21) Appl. No.: 15/906,968

(22) Filed: Feb. 27, 2018

(65) Prior Publication Data

US 2019/0265819 A1    Aug. 29, 2019

(51) Int. Cl.
| | |
|---|---|
| G06F 3/046 | (2006.01) |
| G06F 3/041 | (2006.01) |
| G06F 3/0354 | (2013.01) |
| G02F 1/1333 | (2006.01) |
| G06F 1/16 | (2006.01) |

(52) U.S. Cl.
CPC .......... *G06F 3/046* (2013.01); *G02F 1/13338* (2013.01); *G06F 1/16* (2013.01); *G06F 3/03545* (2013.01); *G06F 3/0412* (2013.01); *G06F 3/0418* (2013.01)

(58) Field of Classification Search
CPC .... G06F 3/046; G06F 3/03545; G06F 3/0412; G02F 1/13338
See application file for complete search history.

(56) References Cited

U.S. PATENT DOCUMENTS

| | | |
|---|---|---|
| 7,292,229 B2 | 11/2007 | Morag |
| 7,436,164 B2 | 10/2008 | Vos |
| 9,870,112 B2 | 1/2018 | Leigh |
| 2008/0150550 A1 | 6/2008 | Vos |
| 2008/0150658 A1 | 6/2008 | Vos |
| 2014/0127993 A1 | 5/2014 | Frankland |
| 2015/0091859 A1* | 4/2015 | Rosenberg .............. G06F 3/044 345/174 |
| 2015/0338888 A1* | 11/2015 | Kim ...................... G06F 1/1677 345/156 |

* cited by examiner

*Primary Examiner* — Wing H Chow
(74) *Attorney, Agent, or Firm* — Prol Intellectual Property Law, PLLC; H. Kenneth Prol

(57) ABSTRACT

A method of tuning an electromagnetic radiation field based on positional configurations of an information handling system may comprise generating an electromagnetic radiation field tuned to detect input from an EMR pen via an EMR digitizer, where the tuning minimizes effects from at least one operational magnet of the information handling system, receiving an indication from a sensor hub of a change in a positional configuration to a first positional configuration, wherein the first positional configuration is one of a plurality of positional configurations defining a degree of rotation of a display housing chassis with respect to a base housing chassis, associating the first positional configuration with a first EMR sheet tuning configuration tuned for the first positional configuration, and instructing a tuning network operably connected to the EMR digitizer to tune an EMR digitizer electromagnetic radiation field to the first EMR sheet tuning configuration.

20 Claims, 11 Drawing Sheets

MOVIE CONFIGURATION

TENT CONFIGURATION

TABLET CONFIGURATION

METHOD AND APPARATUS FOR MULTI CONFIGURATION TUNING FOR MAGNET TO ELECTROMAGNETIC RESONANCE PANEL PROXIMITY

FIELD OF THE DISCLOSURE

The present disclosure generally relates to electromagnetic resonance panel technology in a mobile information handling system. The present disclosure more specifically relates to tuning the electromagnetic field emitted by an electromagnetic resonance digitizer sheet.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include an electromagnetic resonance digitizer sheet capable of communicating with an electromagnetic resonance pen.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
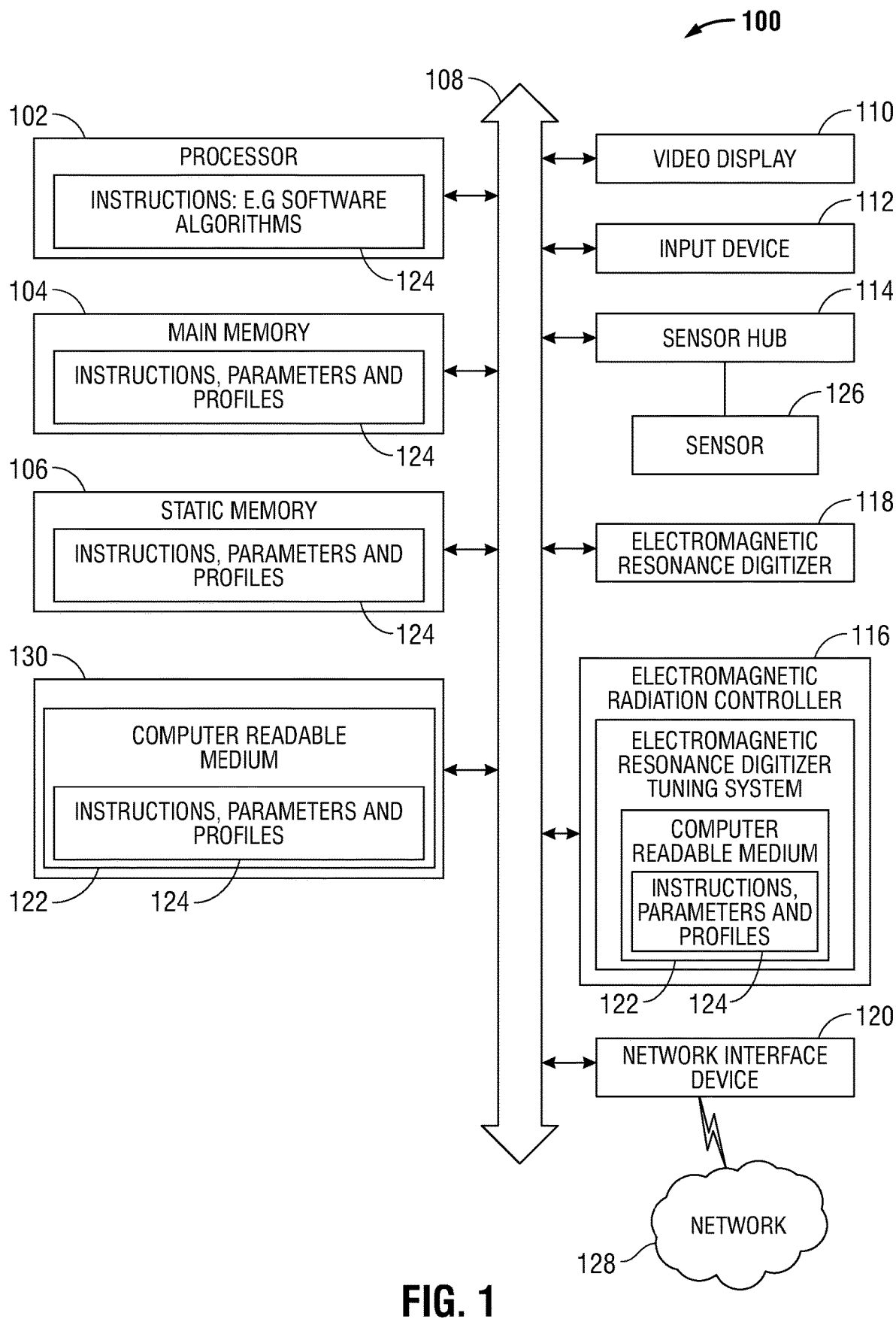
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Electromagnetic resonance (EMR) active pen used with an EMR digitizer is one of the most accurate pens in the market today. The EMR digitizer system in embodiments of the present disclosure may include an EMR digitizer sheet installed behind an LCD display capable of communicating with an EMR pen when it comes into close contact with the LCD display. In a system that supports EMR digitizer technology, an EMR digitizer controller may instruct a drive to send out a high frequency alternating current (AC) to X and Y coils on a digitizer sheet, which may generate a magnetic field. The magnetic field generated by the EMR digitizer sheet may then excite an LC circuit in the EMR pen, which the pen may absorb. The pen may then use this absorbed energy to send out a signal to be detected by the EMR digitizer sheet in return. In such a way, the EMR digitizer sheet may accurately determine the location and motion of the EMR pen with respect to the EMR digitizer sheet lying beneath the LCD display. The EMR digitizer sheet and the LCD display may be housed within a display housing chassis of the information handling system, which may be capable of rotating with respect to a base housing chassis housing a keyboard and other internal components via a hinge. Rotation of the display housing chassis with respect to the base housing chassis in embodiments of the present disclosure may cause the information handling system to operate in a plurality of positional configurations, including but not limited to a closed, clamshell, movie, tent, and tablet mode.

The ability of the EMR digitizer sheet to emit the magnetic field and accurately receive the signal from the EMR pen in embodiments may be affected by external magnetic fields generated by other components within the information handling system including, but not limited to, speaker magnets, hinge magnets, magnets employed to join a base housing chassis and a display housing chassis, and Hall effect or GMR magnets. As one or more of these speakers come into close contact with the EMR digitizer sheet in embodiments, the interference with the generated magnetic fields may increase. In order to account for such interference, the EMR controller instructing the EMR digitizer sheet to emit the magnetic field may tune the currents to the EMR digitizer sheet coils in order to decrease interference from nearby magnets. By tuning the current to the coils of the digitizer sheet, the controller allows for use of stronger magnets or closer placement of the magnets to the EMR digitizer sheet while simultaneously allowing for greater accuracy of communication between the EMR digitizer sheet and the EMR pen. Closer placement of the magnets to the EMR digitizer sheet further allows for minimization of the size of the information handling system housing chassis, which falls in line with current consumer desires.

Current solutions employing such a tuning method only tune the current to regions of X and Y coils in the digitizer sheet to account for static and known proximity of all magnets to the EMR digitizer sheet in an information handling system housing operating according to a clamshell positional configuration. In some embodiments, current to X and Y coils may be tuned to different frequencies, greater amplitude, or operate in a repeated pulse of AC current to account for interference from other magnetic fields. Additional coils may be activated by high frequency current in regions affected by nearby magnets in other embodiments to provide additional data on EMR pen location to hone accuracy.

For example, current solutions account for potential interference of all magnets within the display housing chassis when the display housing chassis is oriented at an angle between zero and 180 degrees from the base housing chassis, such as would be used when a user is typing on the keyboard in a conventional open laptop configuration. Such current solutions may not account for potential interference of all magnets within the base housing chassis, because when the information handling system is operating in the clamshell configuration described directly above, the magnets within the base housing chassis may not be located closely enough to the EMR digitizer sheet to cause interference with the EMR digitizer sheet magnetic field.

As information handling systems evolve to allow for use of the system according to a plurality of positional configurations, including but not limited to clamshell, tent, movie, and tablet modes, a solution is needed to tune the current supplied to the EMR digitizer sheet to avoid interference from any magnets situated nearby the EMR digitizer sheet in each of the possible positional configurations, rather than only in clamshell mode. Embodiments of the present disclosure address these issues by employing an electromagnet resonance digitizer tuning system operated by the EMR controller to tune the current supplied to portions of the EMR digitizer sheet based on the positional configuration in which the information handling system is operating.

In embodiments of the present disclosure, the information handling system may be capable of operating according to a plurality of positional configurations, including but not limited to clamshell, movie, tent, and tablet. The movie configuration in embodiments may place the display housing chassis such that its plane is oriented at an angle between 180 and 320 degrees from the plane of the base housing chassis, and may place the base housing chassis such that the keyboard is facing down and display is facing toward user. The tent configuration in embodiments may place the display housing chassis such that its plane is oriented at an angle between 270 and 340 degrees from the plane of the base housing chassis, and may place the base housing chassis and display housing chassis such that their leading edges are facing down with the display housing chassis facing the user. The tablet configuration in embodiments of the present disclosure may place the display housing chassis such that its plane is oriented between 340 and 360 degrees from the plane of the base housing chassis, and place the keyboard facing down with the display housing chassis facing the user. In each of these configurations, the proximity between magnets within the base housing chassis and the EMR digitizer sheet within the display housing chassis may vary. As a consequence, the EMR digitizer tuning system executed by the controller in embodiments of the present disclosure may alter the tuning scheme used to tune the current supplied to portions of the EMR digitizer sheet based on the configuration in which the information handling system is operating in order to account for all magnets currently placed nearby those portions of the EMR digitizer sheet.

Embodiments of the present disclosure may include one or more sensors capable of determining the current positional configuration of the information handling system, and transmitting a signal indicating such current configuration to the EMR controller. Upon receipt of such a signal, the EMR digitizer tuning system may associate the current positional configuration with an optimal tuning scheme in a memory, and may instruct a tuning network to tune the current delivered to the EMR digitizer sheet according to the identified optimal tuning scheme. This will tune the magnetic field emitted by the EMR digitizer to communicate with an EMR pen and in a portion affected by other magnets in the current positional configuration. Such sensors may also be capable of detecting when a change in positional configuration has occurred, and prompting the EMR digitizer tuning system to repeat this process with each new positional configuration detected. In such a way, the EMR digitizer tuning system of embodiments of the present disclosure may decrease interference between the EMR digitizer sheet and any nearby magnets within the information handling system in each of a plurality of positional configurations without increasing the size or weight of the information handling system.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the electromagnetic resonance digitizer tuning system 132, and drive unit 130 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a video display 110. The video display 110 in an embodiment may function as a liquid crystal display (LCD), an organic light emitting diode (OLED), a flat panel display, a solid state display, or a cathode ray tube (CRT). Additionally, the information handling system 100 may include an alpha numeric input device 112, such as a keyboard, and/or a cursor control device, such as a mouse, touchpad, or gesture or touch screen input. The input device 112 may also include an electromagnetic radiation (EMR) pen, capable of communicating with the electromagnet resonance digitizer 118 in an embodiment. An EMR pen in an embodiment may include an LC circuit capable of excitation when it comes into contact with a magnetic field generated by the EMR digitizer sheet 118. The information handling system 100 can also include a disk drive unit 130.

As described herein, rotation of the information handling system display housing chassis with respect to the base housing chassis in embodiments of the present disclosure may cause the information handling system to operate in a plurality of positional configurations, including but not limited to a closed, clamshell, movie, tent, and tablet mode. The sensor hub 114 in an embodiment may operate to receive indications from one or more sensors 126 of a current positional configuration or a detected change in the positional configuration of the information handling system. Sensor 126 may include a rotation sensor capable of determining the degree of rotation between the information handling system display housing chassis and base housing chassis, such as for example, a giant magneto-resistive (GMR) rotation sensor or a Hall Effect sensor. By detecting the degree of rotation, the sensor 126 may identify the positional configuration of the information handling system and transmit a message identifying the positional configuration to the sensor hub 114, as described herein. In other embodiments, the sensor 126 may transmit the message identifying the position configuration directly to the electromagnetic radiation controller 116, or may transmit the message to the electromagnetic radiation controller 116 via an embedded controller (not shown).

An electromagnetic radiation controller 116 may be operably connected to the sensor hub 114 such that the sensor hub 114 may transmit indications to the electromagnetic radiation controller 116 of the current positional configuration of the information handling system, or a change in the positional configuration of the information handling system. The sensor hub 114 may transmit such indications to the electromagnet radiation controller via, for example, the bus 108. The electromagnetic radiation controller 116 in an embodiment may be a microcontroller unit, control circuitry, or a separate microprocessor. In yet other aspects, the processor 102 may operate as the electromagnetic radiation controller 116. The electromagnetic radiation controller 116 may operate to tune a current delivered to the electromagnetic resonance digitizer 118 in an embodiment.

The electromagnetic radiation (EMR) digitizer 118 in an embodiment may operate as a part of an EMR digitizer system. Such a system in an embodiment may include an EMR digitizer sheet 118 installed behind an LCD display of the video display 110 capable of communicating with an EMR pen when it comes into close contact with the LCD display. In a system that supports EMR digitizer technology, the EMR digitizer controller 116 may instruct a driver to deliver a high frequency AC current to an X and Y coil the EMR digitizer sheet 118, which may generate a magnetic field. The magnetic field generated by the EMR digitizer sheet 118 may then excite an LC circuit in the EMR pen, which the pen may absorb. The pen may then use this absorbed energy to send out a signal to be detected by the EMR digitizer sheet 118 in return. In such a way, the EMR digitizer sheet 118 may accurately determine the location and motion of the EMR pen with respect to the EMR digitizer sheet 118 lying beneath the LCD display of the video display 110.

The ability of the EMR digitizer sheet 118 to emit the magnetic field and accurately receive the signal from the EMR digitizer pen in embodiments may be affected by external magnetic fields generated by other components within the information handling system including, but not limited to, speaker magnets, hinge magnets, magnets employed to join a base housing chassis and a display housing chassis, and magnets operably connected to sensor 126, such as a GMR magnet or a Hall Effect magnet. As one or more of these speakers come into close contact with the EMR digitizer sheet 118 in embodiments, the interference between the magnetic fields may increase. In order to account for such interference, the EMR controller 116 instructing the driver to send the AC current to the X and Y coils of the EMR digitizer sheet 118 (thus emitting the magnetic field) may tune the current supplied to the EMR digitizer sheet 118 in order to decrease interference from nearby magnets. In some embodiments, the EMR digitizer sheet 118 may include a plurality of X and Y coils, which may each receive separately tuned AC currents.

In accordance with various embodiments of the present disclosure, the methods described herein may be implemented by firmware or software programs executable by a controller or a processor system. For example, the electromagnetic radiation controller 116 in an embodiment may be operably connected to the electromagnetic resonance digitizer 118, and may execute firmware or software code instructions of the electromagnetic resonance digitizer tuning system 132 within the electromagnetic radiation controller 116 to tune current delivered to the electromagnetic resonance digitizer 118. Further, in an exemplary, non-limited embodiment, implementations can include distributed processing, component/object distributed processing, and parallel processing. Alternatively, virtual computer system processing can be constructed to implement one or more of the methods or functionality as described herein.

The information handling system 100 may also include a electromagnetic resonance digitizer tuning system 132 of the electromagnetic radiation controller 116 that may be operably connected to the bus 108. The electromagnetic resonance digitizer tuning system 132 computer readable medium 122 may also contain space for data storage. The electromagnetic resonance digitizer tuning system 132 may perform tasks related to receiving trigger inputs indicating positional configurations of the information handling system, and tuning of the current delivered to the electromagnetic resonance digitizer based on the detected current positional configuration.

In an embodiment, the electromagnetic resonance digitizer tuning system 132 executed by the electromagnetic radiation controller 116 or the processor 102 may communicate with the main memory 104, the processor 102, the video display 110, the alpha-numeric input device 112, sensor hub 114, and the network interface device 120 via bus 108, and several forms of communication may be used, including ACPI, SMBus, a 24 MHZ BFSK-coded transmission channel, or shared memory.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The information handling system 100 can include a set of instructions 124 that can be executed to cause the computer system to perform any one or more of the methods or computer based functions disclosed herein. For example, instructions 124 may execute an electromagnetic resonance digitizer tuning system 132, software agents, or other aspects or components. Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The disk drive unit 130 and the electromagnetic resonance digitizer tuning system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 including an estimated training duration table. The disk drive unit 130 and static memory 106 also contain space for data storage. Further, the instructions 124 may embody one or more of the methods or logic as described herein. For example, instructions relating to the electromagnetic resonance digitizer tuning system 132 software algorithms may be stored here. In a particular embodiment, the instructions, parameters, and profiles 124 may reside completely, or at least partially, within the main memory 104, the static memory 106, and/or within the disk drive 130 during execution by the processor 102 of information handling system 100. As explained, some or all of the electromagnetic resonance digitizer tuning system 132 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The electromagnetic resonance digitizer tuning system 132 and the drive unit 130 may include a computer-readable medium 122 such as a magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
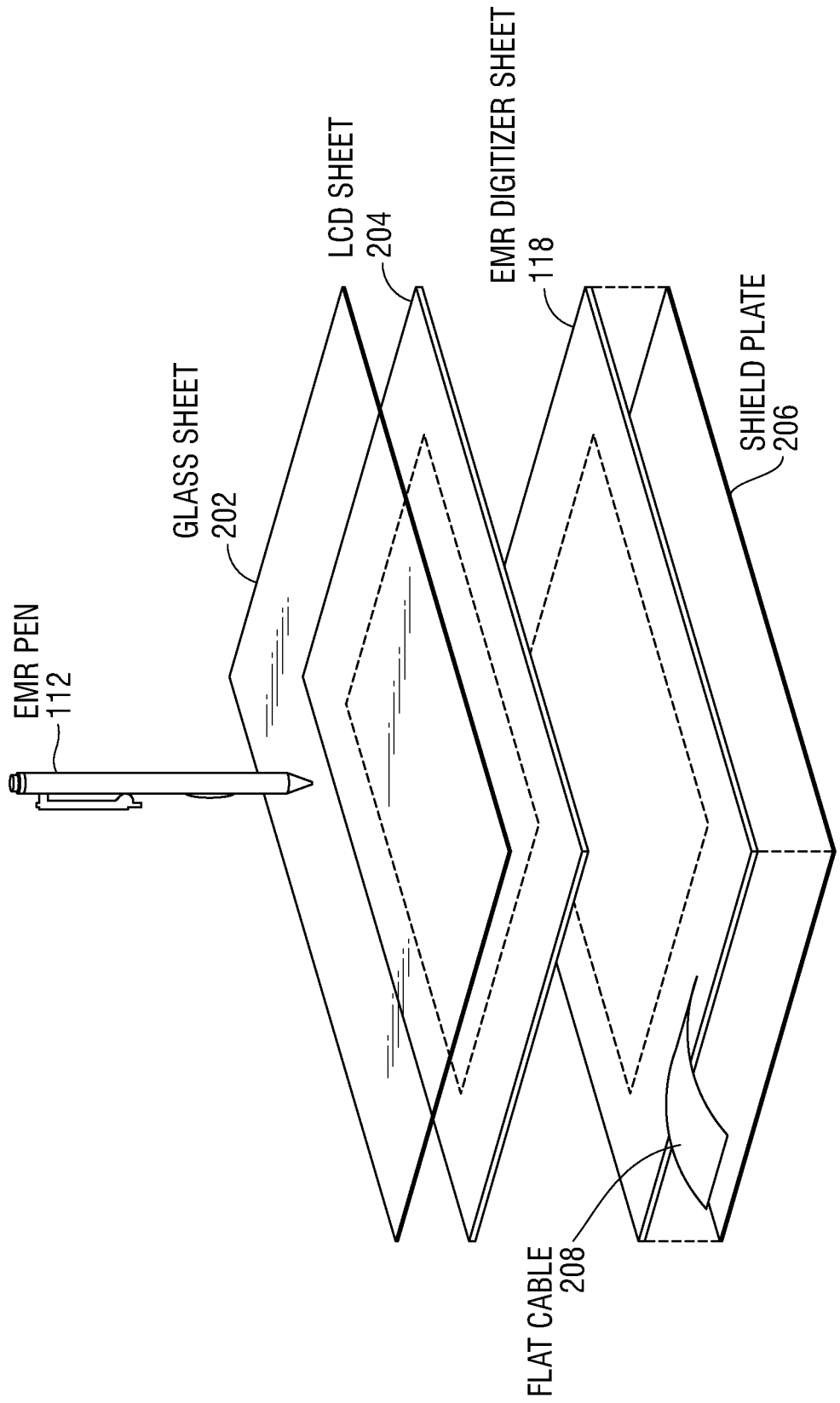
FIG. 2 is an exploded view of an electromagnetic resonance digitizer system according to an embodiment of the present disclosure.

FIG. 2 is an exploded view of an electromagnetic resonance digitizer system capable of communicating with an EMR pen according to an embodiment of the present disclosure. An EMR digitizer system in an embodiment may include an EMR pen 112 capable of communications with an EMR digitizer sheet 118. Such a system in an embodiment may include an EMR digitizer sheet 118 installed behind an LCD display 204 and a glass sheet 202 of the video display. In a system that supports EMR digitizer technology, EMR digitizer sheet 118 may include one or more sets of X and Y coils that receive high frequency alternating current (AC), causing the EMR digitizer sheet 118 to generate a magnetic field permeating the LCD sheet 204 and the glass sheet 202. The magnetic field generated by the EMR digitizer sheet 118 may then excite an LC circuit in the EMR pen 112, which the pen 112 may absorb. The pen 112 may then use this absorbed energy to send out a signal to be detected by the EMR digitizer sheet 118 in return. In such a way, the EMR digitizer sheet 118 may accurately determine the location and motion of the EMR pen 112 with respect to the EMR digitizer sheet 118 lying beneath the LCD display 204 and the glass sheet 202.

The glass sheet 202, LCD sheet 204, EMR digitizer sheet 118, shield plate 206, and flat cable 208 may be housed within a display housing chassis of the information handling system. The glass sheet 202 may operate to protect the internal components of the LCD video display, and may comprise materials other than glass, including but not limited to plastics or other materials routinely used as to form the screen of digital displays in laptop computers, tablet computers, and/or smart phones. The shield plate 206 may operate to shield components situated on the side opposite the EMR digitizer sheet 118 housed within the display housing chassis, and may comprise any material known to shield electrical and electromagnetic components within the information handling system. The flat cable 208 may operably connect the EMR digitizer sheet 118 to the EMR controller executing code instructions of the electromagnetic resonance digitizer tuning system in an embodiment. Current supplied to the X and Y coils of the EMR digitizer sheet 118 in order to generate the electromagnetic field with which the EMR pen 112 may interact may be supplied via the flat cable 208.

Figure 3:
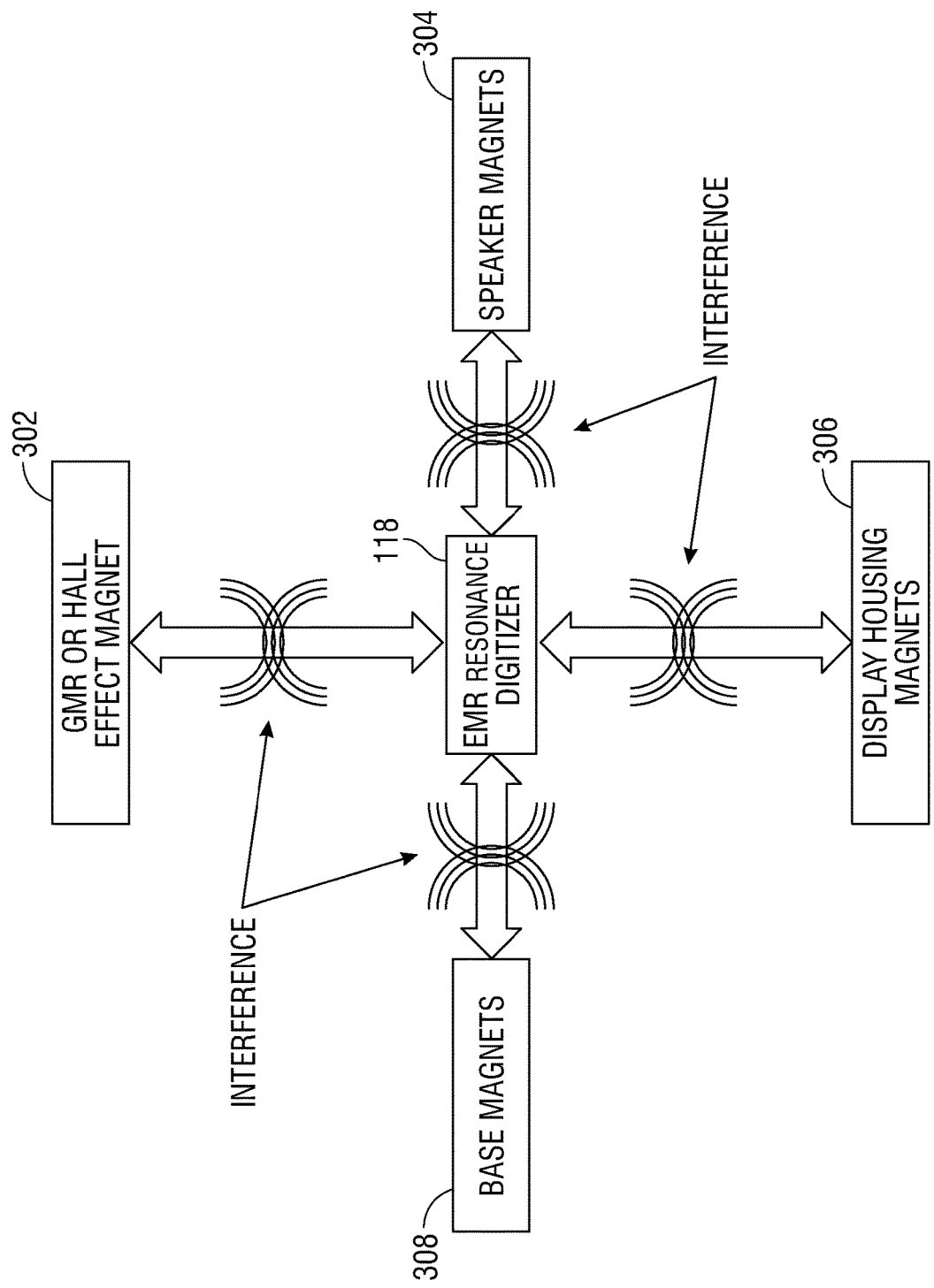
FIG. 3 is a block diagram illustrating interference affecting an EMR resonance digitizer according to an embodiment of the present disclosure.

FIG. 3 is a block diagram illustrating interference from a plurality of nearby magnets affecting an EMR resonance digitizer according to an embodiment of the present disclosure. The ability of the EMR digitizer sheet 118 to emit the magnetic field and accurately receive the signal from the EMR digitizer pen in embodiments may be affected by external magnetic fields generated by other components within the information handling system including, but not limited to, Hall effect or magnets within the giant magneto-resistive (GMR) rotation sensor 302, speaker magnets 304, and hinge magnets (not shown). In other aspects, such magnets may include magnets employed to join a base housing chassis and a display housing chassis such as display housing magnets 306 and base magnets 308. As one or more of these speakers come into close contact with the EMR digitizer sheet 118 in embodiments, the interference between the magnetic fields may increase.

Figure 4A:
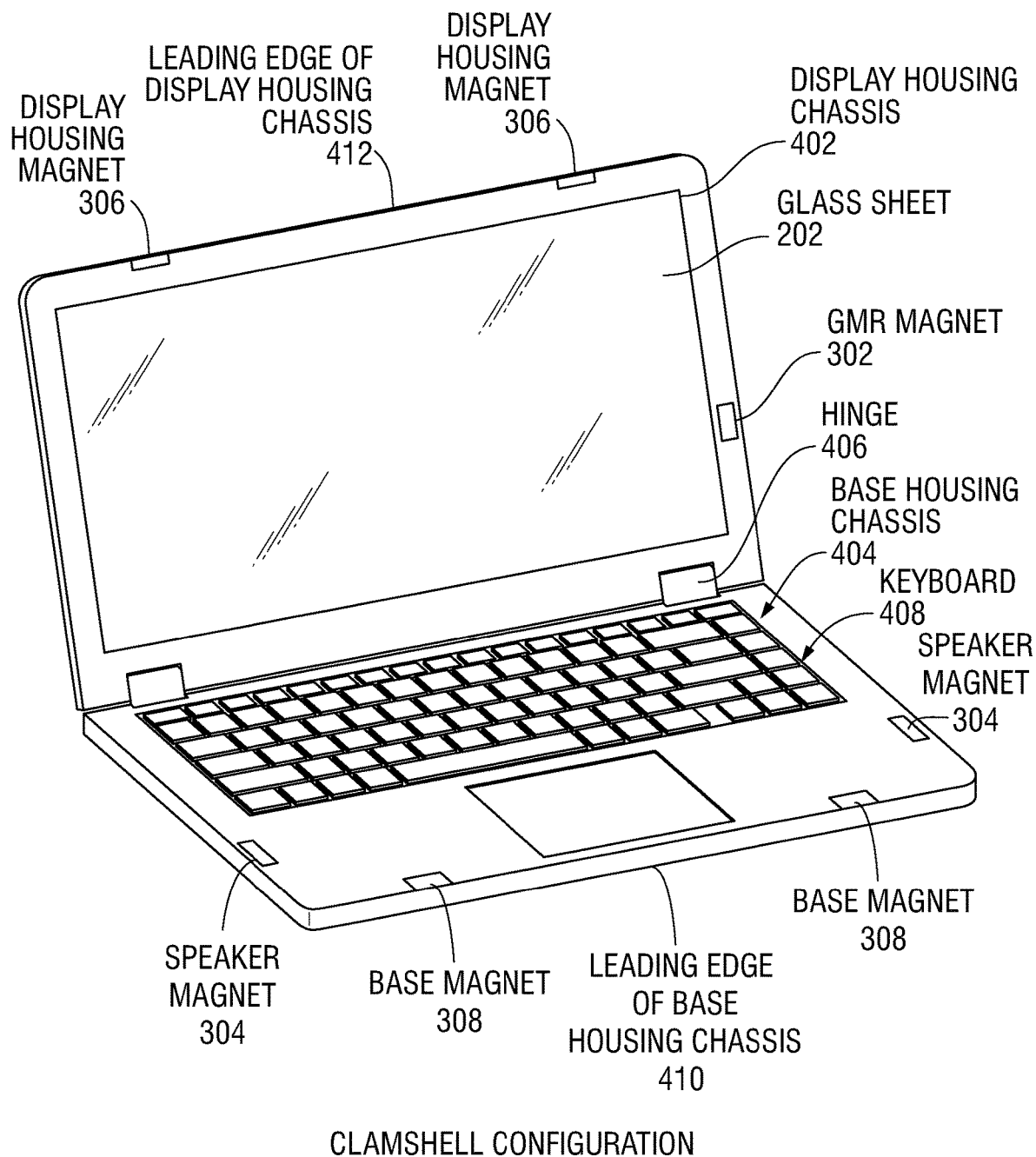
FIG. 4A is a block diagram illustrating a clamshell configuration of an information handling system according to an embodiment of the present disclosure.

FIG. 4A is a block diagram illustrating a clamshell configuration in which a display housing chassis is rotated away from a base housing chassis of an information handling system according to an embodiment of the present disclosure. An information handling system in an embodiment may be housed within a display housing chassis 402, and a base housing chassis 404 rotatably attached to one another via one or more hinges 406. The base housing chassis 404 may include a keyboard 408, and the display housing 402 may include a glass sheet 202 of a digital display. The information handling system in an embodiment may be placed in a clamshell configuration by rotating the leading edge of the display housing chassis 412 away from the leading edge of base housing chassis 410 by an angle between zero degrees and one hundred eighty (180) degrees.

The display housing chassis 402 in an embodiment may further include one or more GMR or Hall Effect magnets 302, and one or more display housing magnets 306 situated in the leading edge of display housing chassis 412 that operate to form a magnetic attachment to the base magnets 308 situated in the leading edge of the base housing chassis 404. For example, a giant magneto-resistive (GMR) rotation sensor may be operably connected to a GMR magnet 302, and may operate to determine the degree of rotation between the leading edge 412 of the display housing chassis 402 and the leading edge 410 of the base housing chassis 404. Further, the rotation between the leading edge 412 of the display housing chassis 402 and the leading edge 410 of the base housing chassis 404 may identify the positional configuration of the information handling system, as described herein. The EMR digitizer sheet in an embodiment may be situated within the display housing chassis 402, behind the glass sheet 202, and may be in close proximity to the display housing magnets 306 and/or the GMR magnet 302 while the information handling system is operating in a clamshell configuration.

The base housing chassis 404 in an embodiment may further include one or more speaker magnets 304 within a rotation sensor operating to determine the positional configuration of the information handling system. When operating in a clamshell configuration the speaker magnet 304, and base magnet(s) 308 may be positioned sufficiently distantly from the EMR resonance digitizer located behind the glass sheet 202 such that the speaker magnet 304, and base magnet(s) 308 may not cause interference in the electromagnetic field generated by the EMR resonance digitizer. As such, any tuning of the current supplied to the EMR resonance digitizer to generate the EM field may only take into account interference from the one or more display housing magnets 306 and the one or more GMR magnets 302 in some embodiments.

In other embodiments, the display housing chassis 402 may include other magnets not shown here that may cause further interference with the EMR digitizer sheet, and the current supplied to the EMR digitizer sheet may be tuned for such other interferences. In yet further embodiments, speaker magnet 304, and/or base magnets 308 may cause interference with the EMR digitizer sheet when the information handling system is placed in the clamshell configuration, and the current supplied to the EMR digitizer sheet may be tuned for such other interferences. In yet further embodiments, the base housing chassis 404 may include other magnets not shown here that may cause further interference with the EMR digitizer sheet when the information handling system is placed in the clamshell configuration, and the current supplied to the EMR digitizer sheet may be tuned for such other interferences. The location of each magnet in the information handling system and the proximity of such magnet to the EMR digitizer sheet in an embodiment may be known with respect to each possible positional configuration. As such, the interference between each of these magnets and the EMR digitizer sheet expected to be encountered when the information handling system is placed in any positional configuration may also be known. As described herein, the EMR digitizer tuning system in an embodiment may be capable of associating the current positional configuration of the information handling system with a tuning configuration pre-determined to remove or lessen interference caused by magnets that would be placed nearby the EMR digitizer sheet when the information handling system is placed in the current positional configuration.

Figure 4B:
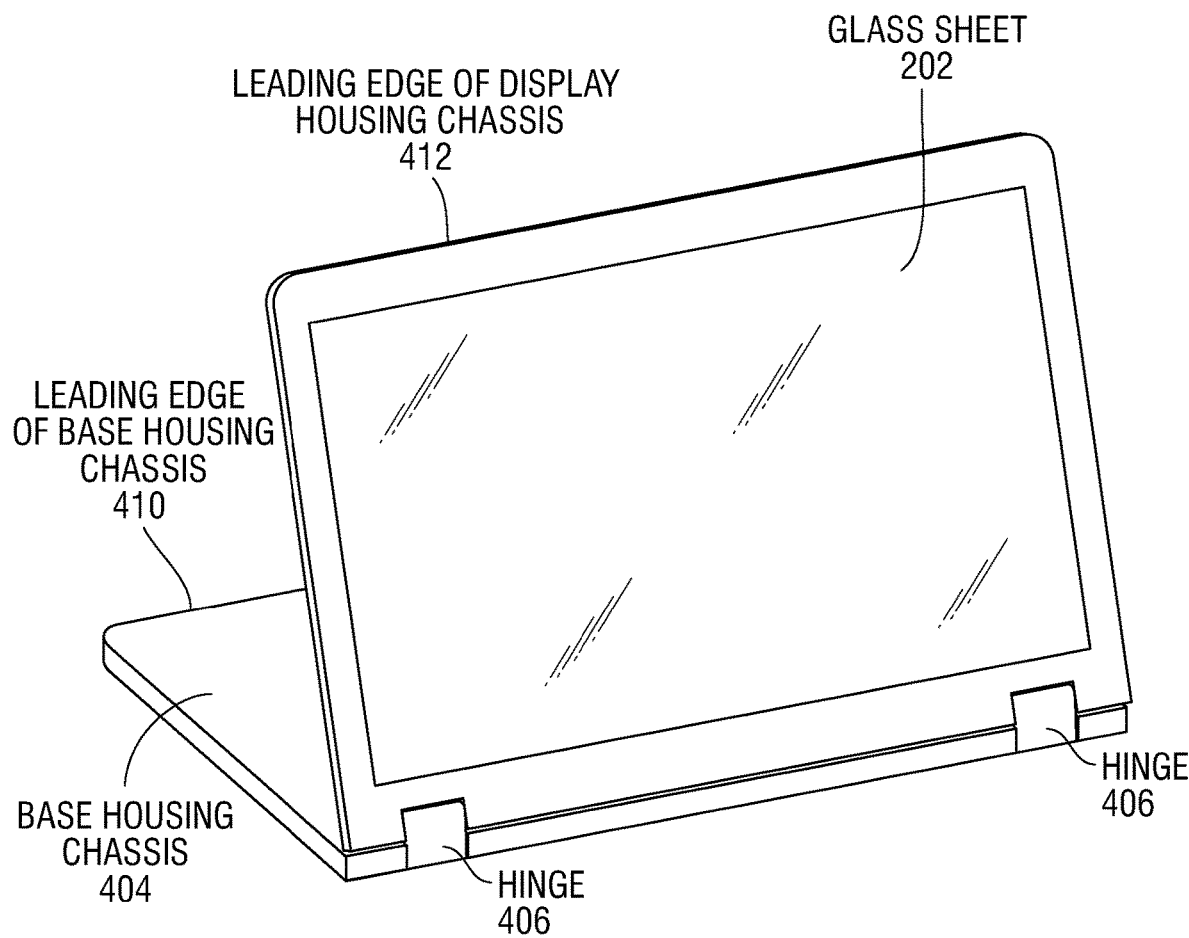
FIG. 4B is a block diagram illustrating a movie configuration of an information handling system according to an embodiment of the present disclosure.

FIG. 4B is a block diagram illustrating a movie configuration in which a display housing chassis is rotated away from a base housing chassis of an information handling system according to an embodiment of the present disclosure. The information handling system in an embodiment may be placed in a movie configuration by rotating the leading edge 412 of the display housing chassis away from the leading edge 410 of the base housing chassis 404 by an angle between two hundred seventy (270) degrees and three hundred twenty (320) degrees.

Similarly to the clamshell configuration described herein, the EMR digitizer sheet in an embodiment may be situated within the display housing chassis 402, behind the glass sheet 202, and may be in close proximity to the display housing magnets incorporated along the leading edge of the display housing chassis 412 and/or the GMR magnet while the information handling system is operating in the movie configuration. Thus, the EMR digitizer tuning system in an embodiment may tune for interference caused by the display housing magnets and/or GMR magnets in both the movie configuration and the clamshell configuration.

In some embodiments, also similarly to the clamshell configuration, when operating in a movie configuration the speaker magnet, and base magnet(s) housed in the base housing chassis may be positioned sufficiently distantly from the EMR resonance digitizer located behind the glass sheet 202 such that they may not cause interference in the electromagnetic field generated by the EMR resonance digitizer. As such, any tuning of the current supplied to the EMR resonance digitizer to generate the EM field may only take into account interference from the one or more display housing magnets in such embodiments. In other aspects, the display housing chassis 402 may include other magnets not shown here that may cause further interference with the EMR digitizer sheet, and the current supplied to the EMR digitizer sheet may be tuned for such other interferences.

In other embodiments, unlike the clamshell configuration, when operating in a movie configuration, one or more of the speaker magnet, and base magnet(s) housed in the base housing chassis may be positioned sufficiently closely to the EMR resonance digitizer located behind the glass sheet 202 such that they may cause interference in the electromagnetic field generated by the EMR resonance digitizer. As such, any tuning of the current supplied to the EMR resonance digitizer to generate the EM field may take into account interference from the one or more display housing magnets and interference caused by one or more of the speaker magnet, and base magnet(s) housed in the base housing chassis in such embodiments.

In yet further embodiments, one or more of the speaker magnet, and/or base magnets may cause interference with the EMR digitizer sheet when the information handling system is placed in the movie configuration, and the current supplied to the EMR digitizer sheet may be tuned for such other interferences. In other further embodiments, the base housing chassis 404 may include other magnets not shown here that may cause further interference with the EMR digitizer sheet when the information handling system is placed in the movie configuration, and the current supplied to the EMR digitizer sheet may be tuned for such other interferences. In yet further embodiments, the movie mode may optionally be associated with peripheral devices that may include magnets that may cause interference, such as external speakers placed on either side of the display screen. As described herein, the EMR digitizer tuning system in an embodiment may be capable of associating the current positional configuration of the information handling system with a tuning configuration pre-determined to remove or lessen interference caused by magnets that would be placed nearby the EMR digitizer sheet when the information handling system is placed in the current positional configuration.

Figure 4C:
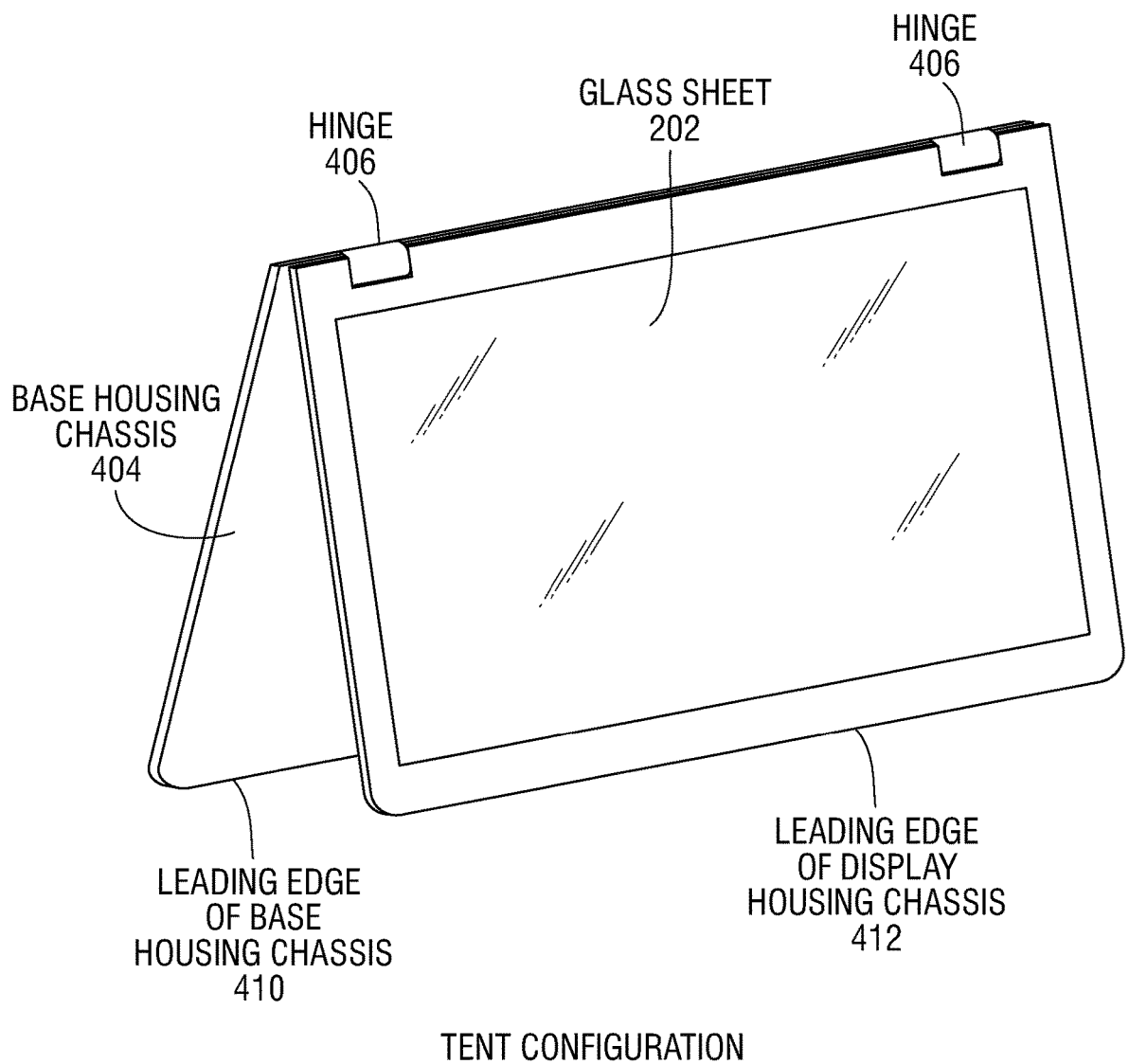
FIG. 4C is a block diagram illustrating a tent configuration of an information handling system according to an embodiment of the present disclosure.

FIG. 4C is a block diagram illustrating a tent configuration in which a display housing chassis is rotated away from a base housing chassis of an information handling system according to an embodiment of the present disclosure. The information handling system in an embodiment may be placed in a tent configuration by rotating the leading edge 412 of the display housing chassis away from the leading edge 410 of the base housing chassis 404 by an angle between two hundred seventy (270) degrees and three hundred forty (340) degrees.

Similarly to the clamshell configuration described herein, the EMR digitizer sheet in an embodiment may be situated within the display housing chassis 402, behind the glass sheet 202, and may be in close proximity to the display housing magnets incorporated along the leading edge of the display housing chassis 412 and/or the GMR magnet while the information handling system is operating in the tent configuration. Thus, the EMR digitizer tuning system in an embodiment may tune for interference caused by the display housing magnets and/or the GMR magnet in each of the clamshell, movie and tent configurations.

In some embodiments, also similarly to the clamshell configuration, when operating in a tent configuration the speaker magnet, and base magnet(s) housed in the base housing chassis may be positioned sufficiently distantly from the EMR resonance digitizer located behind the glass sheet 202 such that they may not cause interference in the electromagnetic field generated by the EMR resonance digitizer. As such, any tuning of the current supplied to the EMR resonance digitizer to generate the EM field may only take into account interference from the one or more display housing magnets and/or the GMR magnet in such embodiments. In other aspects, the display housing chassis 402 may include other magnets not shown here that may cause further interference with the EMR digitizer sheet, and the current supplied to the EMR digitizer sheet may be tuned for such other interferences.

In other embodiments, unlike the clamshell configuration, when operating in a tent configuration, one or more of the speaker magnet, and base magnet(s) housed in the base housing chassis 404 may be positioned sufficiently closely to the EMR resonance digitizer located behind the glass sheet 202 such that they may cause interference in the electromagnetic field generated by the EMR resonance digitizer. As such, any tuning of the current supplied to the EMR resonance digitizer to generate the EM field may take into account interference from the one or more display housing magnets and interference caused by one or more of the GMR magnet, speaker magnet, and base magnet(s) housed in the base housing chassis in such embodiments.

In yet further embodiments, speaker magnet, and/or base magnets may cause interference with the EMR digitizer sheet when the information handling system is placed in the tent configuration, and the current supplied to the EMR digitizer sheet may be tuned for such other interferences. In yet further embodiments, the base housing chassis 404 may include other magnets not shown here that may cause further interference with the EMR digitizer sheet when the information handling system is placed in the tent configuration, and the current supplied to the EMR digitizer sheet may be tuned for such other interferences. As described herein, the EMR digitizer tuning system in an embodiment may be capable of associating the current positional configuration of the information handling system with a tuning configuration pre-determined to remove or lessen interference caused by magnets that would be placed nearby the EMR digitizer sheet when the information handling system is placed in the current positional configuration.

Figure 4D:
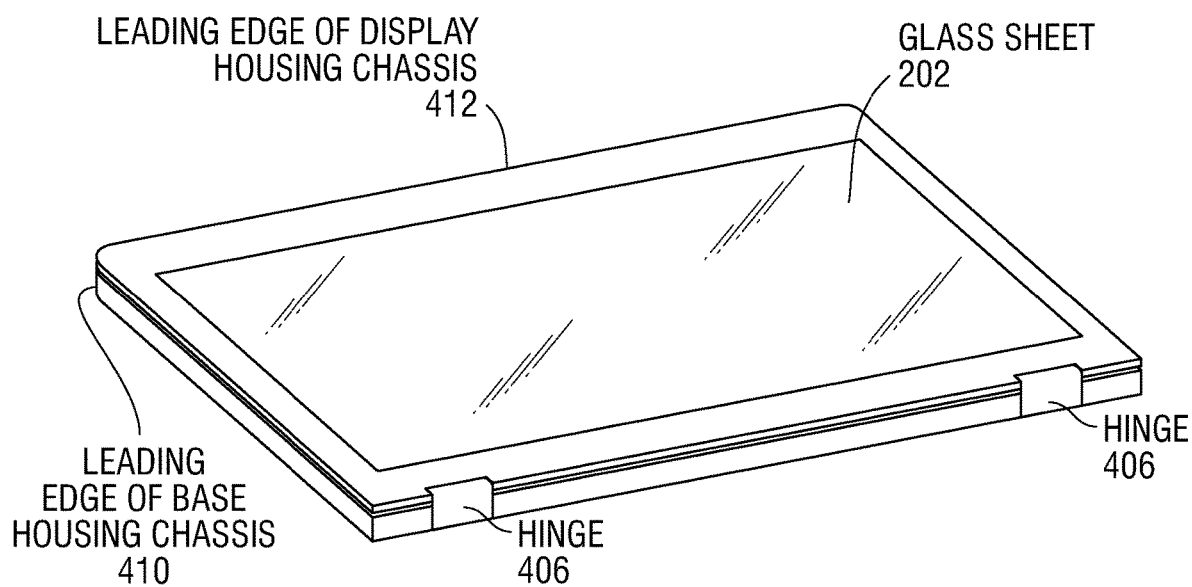
FIG. 4D is a block diagram illustrating a tablet configuration of an information handling system according to an embodiment of the present disclosure.

FIG. 4D is a block diagram illustrating a tablet configuration in which a display housing chassis is rotated away from a base housing chassis of an information handling system according to an embodiment of the present disclosure. The information handling system in an embodiment may be placed in a tablet configuration by rotating the leading edge 412 of the display housing chassis away from the leading edge 410 of the base housing chassis by an angle between three hundred forty (340) degrees and three hundred sixty (360) degrees. In other words, in an embodiment in which the information handling system is placed in a tablet configuration, the plane of the display housing chassis may lie substantially parallel to the plane of the base housing chassis, as shown in FIG. 4D.

Similarly to the clamshell configuration described herein, the EMR digitizer sheet in an embodiment may be situated within the display housing chassis 402, behind the glass sheet 202, and may be in close proximity to the display housing magnets incorporated along the leading edge of the display housing chassis 412 and/or the GMR magnet while the information handling system is operating in the tablet configuration. Thus, the EMR digitizer tuning system in an embodiment may tune for interference caused by the display housing magnets and/or the GMR magnet in each of the clamshell, movie, tent, and tablet configurations.

In other aspects of an embodiment, unlike the clamshell configuration, when operating in a tablet configuration, one or more of the speaker magnet, and base magnet(s) housed in the base housing chassis may be positioned sufficiently closely to the EMR resonance digitizer located behind the glass sheet 202 such that they may cause interference in the electromagnetic field generated by the EMR resonance digitizer. As such, any tuning of the current supplied to the EMR resonance digitizer to generate the EM field may take into account interference from the one or more display housing magnets and interference caused by one or more of the GMR magnet, speaker magnet, and base magnet(s) housed in the base housing chassis in such embodiments.

In yet further embodiments, one or more of the speaker magnet, and/or base magnets may cause interference with the EMR digitizer sheet when the information handling system is placed in the tablet configuration, and the current supplied to the EMR digitizer sheet may be tuned for such other interferences. In yet further embodiments, the base housing chassis may include other magnets not shown here that may cause further interference with the EMR digitizer sheet when the information handling system is placed in the tablet configuration, and the current supplied to the EMR digitizer sheet may be tuned for such other interferences. As described herein, the EMR digitizer tuning system in an embodiment may be capable of associating the current positional configuration of the information handling system with a tuning configuration pre-determined to remove or lessen interference caused by magnets that would be placed nearby the EMR digitizer sheet when the information handling system is placed in the current positional configuration.

Figure 5:
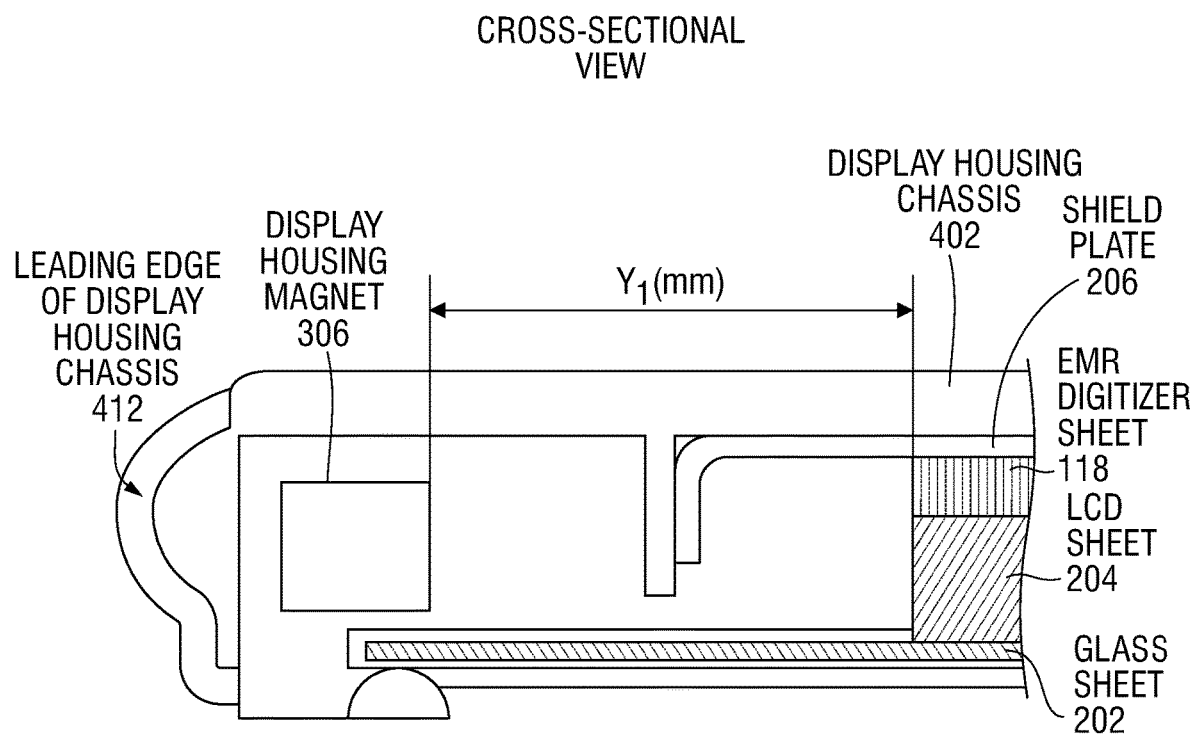
FIG. 5 is a block diagram illustrating a cross-sectional view of a display housing chassis according to an embodiment of the present disclosure.

FIG. 5 is a block diagram illustrating a cross-sectional view of a display housing chassis housing a display housing magnet in proximity to an EMR digitizer sheet according to an embodiment of the present disclosure. As described herein, the EMR digitizer sheet 118 may be located within the display housing chassis 402, between a shield plate 206 and an LCD sheet 204, and a glass sheet 202 may operate to protect the interior components of the LCD sheet 204. The display housing chassis 402 in an embodiment may further include one or more display housing magnets 306 situated in the leading edge 412 of display housing chassis 402 that operate to form a magnetic attachment to the base magnets situated in the leading edge of the base housing chassis (not shown).

The display housing magnet 306 in an embodiment may be situated a distance $Y_1$ (measured in millimeters) away from the EMR digitizer sheet 118. Because the display housing magnet 306 and the EMR digitizer sheet 118 in an embodiment may both be located within the display housing chassis 402, the distance $Y_1$ between the display housing magnet 306 and the EMR digitizer sheet 118 may not vary as the display housing chassis 402 rotates with respect to the base housing chassis (not shown). Further, because the interference caused by the display housing magnet 306 on the EM field generated by the EMR digitizer sheet 118 depends on the distance $Y_1$ between the display housing magnet 306 and the EMR digitizer sheet 118, the interference caused by the housing magnet 306 may remain static, regardless of the positional configuration of the information handling system. As such, the EMR controller in an embodiment may execute instructions of the EMR digitizer tuning system to tune the current supplied to the EMR digitizer sheet to account for interference caused by the display housing magnet 306 when the information handling system is placed in all positional configurations, including but not limited to the clamshell, movie, tent, and tablet configurations. Although not shown in FIG. 5, the GMR or hall effect magnet in an embodiment may similarly be located a fixed distance from the EMR digitizer sheet 118, and that fixed distance may remain static as the information handling system is moved through various positional configurations. As such, the EMR controller in an embodiment may also execute instructions of the EMR digitizer tuning system to tune the current supplied to the EMR digitizer sheet to account for interference caused by the GMR or hall effect magnet (not shown) when the information handling system is placed in all positional configurations, including but not limited to the clamshell, movie, tent, and tablet configurations.

Figure 6:
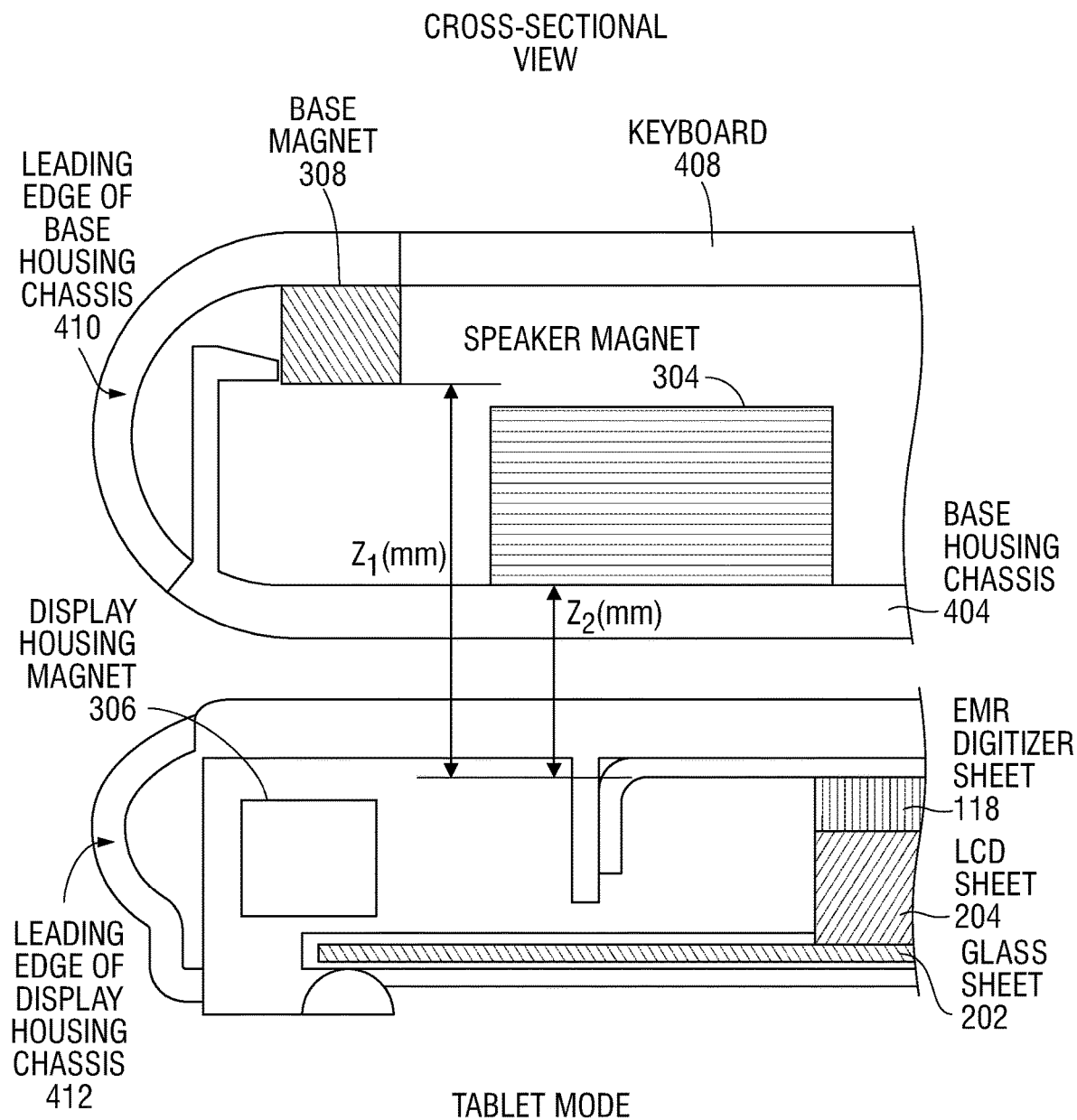
FIG. 6 is a block diagram illustrating a cross-sectional view of a display housing chassis and a base housing chassis according to an embodiment of the present disclosure.

FIG. 6 is a block diagram illustrating a cross-sectional view of a display housing chassis and a base housing chassis placed in a tablet configuration according to an embodiment of the present disclosure. As described herein, when placed in a tablet configuration, the leading edge 410 of the base housing chassis 404 may be rotated between 340 and 360 degrees from the leading edge 412 of the display housing chassis 402, such that the side of the base housing chassis 404 housing the keyboard 408 may be situated furthest away from side of the display housing chassis 402 housing the glass sheet 202. The base housing chassis 404 in an embodiment may further house a speaker magnet 304, as well as one or more base housing magnets 308 situated in the leading edge 410 of the base housing chassis 404 that operate to form a magnetic attachment to the display housing magnet(s) 306 situated in the leading edge of the display housing chassis 402.

The base housing magnet 308 in an embodiment may be situated a distance $Z_1$ (measured in millimeters) away from the EMR digitizer sheet 118, and the speaker magnet 304 may be situated a distance $Z_2$ away from the EMR digitizer sheet 118, when the information handling system is placed in a tablet configuration. As the leading edge 412 of the display housing chassis rotates away from the leading edge 410 of the base housing chassis (e.g. back toward a tent configuration), the distances $Z_1$ and $Z_2$ may increase. Depending on the positional configuration of the information handling system, the distances $Z_1$ and $Z_2$ may be sufficiently small such that one or more of the base magnet 308 and speaker magnet 304 may cause interference to the EM field generated by the EM digitizer sheet 118. For example, the distances $Z_1$ and $Z_2$ as measured while the information handling is placed in a tablet configuration, as shown in FIG. 6, may be sufficiently small such that both the base magnet 308 and speaker magnet 304 may cause interference to the EM field generated by the EM digitizer sheet 118. As another example, the distance $Z_1$ as measured while the information handling is placed in a tent configuration may be sufficiently great such that the base magnet 308 may not cause interference to the EM field generated by the EM digitizer sheet 118, but the distance $Z_2$ in the same configuration may be sufficiently small such that the speaker magnet 304 does cause interference to the EM field generated by the EM digitizer sheet 118. As yet another example, the distances $Z_1$ and $Z_2$ as measured while the information handling is placed in a movie configuration may be sufficiently small such that neither the base magnet 308 nor speaker magnet 304 may cause interference to the EM field generated by the EM digitizer sheet 118. These are only example embodiments, and the identification and number of magnets capable of causing interference to the EM field generated by the EMR digitizer sheet 118 may vary in other embodiments.

Once the distance from the EMR digitizer sheet 118 at which each magnet may cause interference to the EM field generated by the EMR digitizer sheet 118 in an embodiment is known, as well as the distance of each magnet from the EMR digitizer sheet 118 based on the rotation angle measured between the leading edge 410 of the base housing chassis 404 and the leading edge 412 of the display housing chassis, the EMR digitizer tuning system may determine how to tune the current supplied to the X and Y coils of the EMR digitizer sheet 118 in order to decrease the interference caused by those magnets. For example, when the information handling system is placed in a tablet configuration known to place the base magnet 308 and the speaker magnet 304 close enough to the EM digitizer sheet 118 in order to cause interference, the EMR digitizer tuning system in an embodiment may instruct the controller to tune the current supplied to the X and Y coils of the EMR digitizer sheet 118 in order to decrease interference caused by the speaker magnet 304, the base magnet 308, and the display housing magnet 306 (which may cause interference in each of the positional configurations as described above with reference to FIG. 5). The EMR digitizer tuning system in such an embodiment may tune the current by, for example, tuning the current delivered to specific regions of the X and Y coils of the digitizer sheet located closest to the speaker magnet 304, the base magnet 308, and/or the display housing magnet 306 to account for static and known proximity of one or more of those magnets to the EMR digitizer sheet 118 in an information handling system operating according to a tablet mode. In other embodiments, the EMR digitizer sheet 118 may include a plurality of sets of X and Y coils, with some sets of X and Y coils known to be located in close proximity to one or more of the speaker magnet 304, the base magnet 308, and/or the display housing magnet 306 in an information handling system operating according to a tablet mode. In such embodiments, the EMR digitizer tuning system may tune the current by, for example, tuning the current delivered to the set of X and Y coils known to be located in close proximity to one or more of these magnets differently than the current delivered to other sets of X and Y coils not known to be located in close proximity to those magnets when it is determined the information handling system is operating according to the tablet mode. Tuning of current supplied to one or more sets of X and Y coils of the EMR digitizer sheet 118 in embodiments may include tuning one or more currents to different frequencies, greater amplitudes, or operating one or more currents in a repeated pulse.

As another example, when the information handling system is placed in a tent configuration known to place the speaker magnet 304 close enough to the EM digitizer sheet 118 in order to cause interference, but not to place the base magnet 308 close enough to cause interference, the EMR digitizer tuning system in an embodiment may instruct the controller to tune the current supplied to the one or more sets of X and Y coils of the EMR digitizer sheet 118 in order to decrease interference caused by the speaker magnet 304, and the display housing magnet 306. As yet another example, when the information handling system is placed in a clamshell configuration known to place neither the base magnet 308 nor the speaker magnet 304 close enough to the EM digitizer sheet 118 in order to cause interference, the EMR digitizer tuning system in an embodiment may instruct the controller to tune the current supplied to the one or more sets of X and Y coils of the EMR digitizer sheet 118 in order to decrease interference caused by only the display housing magnet 306, and/or other magnets having a fixed position close enough to the EMR digitizer sheet 118 to cause interference, regardless of the positional configuration of the information handling system. Again, these are only example embodiments, and the identification and number of magnets capable of causing interference to the EM field generated by the EMR digitizer sheet 118 may vary in other embodiments.

Figure 7:
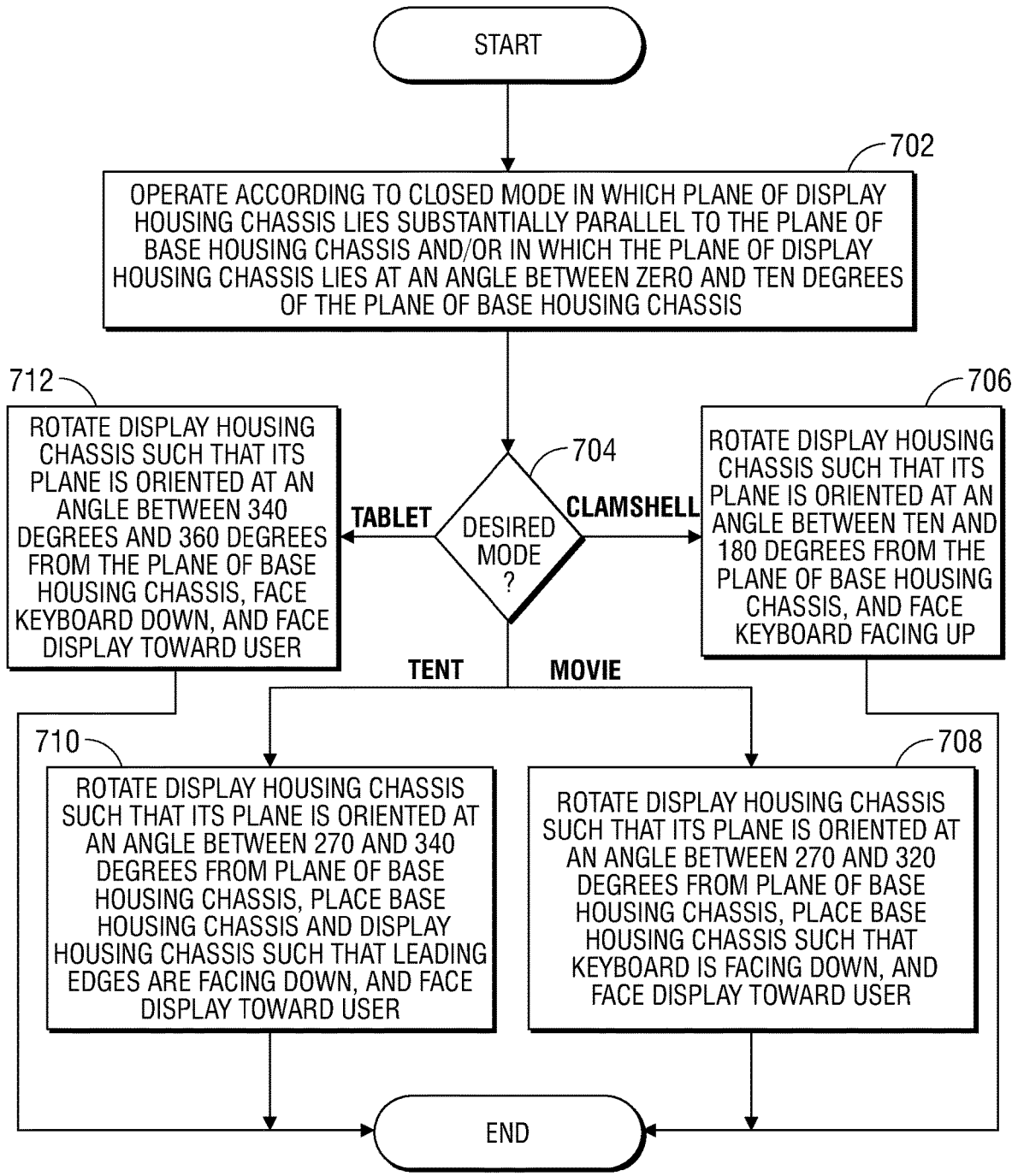
FIG. 7 is a block diagram illustrating a method of operating an information handling system according to a plurality of positional configurations according to an embodiment of the present disclosure.

FIG. 7 is a block diagram illustrating a method of operating an information handling system according to a plurality of positional configurations including a clamshell, movie, tent, and tablet configuration according to an embodiment of the present disclosure. As described herein the information handling system may be housed in a display housing chassis and a base housing chassis. At block 702, in an embodiment, the information handling system may operate according to a closed mode in which the plane of the display housing chassis lies substantially parallel to the plane of the base housing chassis and/or in which the plane of the display housing chassis lies at an angle between zero and ten degrees of the plane of the base housing chassis. In such an embodiment, while operating in the closed configuration, the surface of the base housing chassis housing the keyboard may be the closest portion of the base housing chassis to the display housing chassis. Similarly, in such an embodiment, while operating in the closed configuration, the surface of the display housing chassis housing the glass sheet of the video display may be the closest portion of the display housing chassis to the base housing chassis. When the keyboard of the base housing chassis and the glass sheet of the display housing chassis abut one another or their respective planes are said to be substantially parallel, the angle of rotation between the display housing chassis and base housing chassis may measure zero degrees.

At block 704, a desired mode or positional configuration is determined. The display housing chassis of the information handling system may house the video display, and may be capable of rotating with respect to a base housing chassis housing a keyboard and other internal components via a hinge. Rotation of the display housing chassis with respect to the base housing chassis in embodiments of the present disclosure may cause the information handling system to operate in a plurality of positional configurations, including but not limited to a closed, clamshell, movie, tent, and tablet mode. The information handling system in an embodiment may be rotated from a first positional configuration including any known configuration (e.g. closed, clamshell, movie, tent, and tablet) to a second positional configuration also including any known configuration (e.g. closed, clamshell, movie, tent, and tablet). In other words, the method illustrated by FIG. 7 is not limited to rotation to a second positional configuration from the closed positional configuration. If the clamshell positional configuration is the currently desired configuration, the method may proceed to block 706. If the movie positional configuration is the currently desired configuration, the method may proceed to block 708. If the tent positional configuration is the currently desired configuration, the method may proceed to block 710. If the tablet positional configuration is the currently desired configuration, the method may proceed to block 712.

At block 706, if the clamshell positional configuration is the currently desired configuration, the display housing chassis may be rotated away from the base housing chassis via one or more hinges such that its plane is oriented at an angle between ten and 180 degrees from the plane of the base housing chassis. For example, in an embodiment described with reference to FIG. 4A, an information handling system may be housed within a display housing chassis 402, and a base housing chassis 404 rotatably attached to one another via one or more hinges 406. The information handling system in such an embodiment may be placed in a clamshell configuration by rotating the leading edge of the display housing chassis 412 away from the leading edge of base housing chassis 410 by an angle between zero degrees and one hundred eighty (180) degrees. In other aspects, the information handling system operating according to a clamshell configuration may be situated such that the keyboard portion of the base housing chassis is facing vertically up with respect to the rest of the base housing chassis, such that a user may interact with the keyboard. For example, in an embodiment described with respect to FIG. 4A, the keyboard 408 may be facing vertically up with respect to the rest of the base housing chassis 404, such that a user may interact with the keyboard 408. Returning to FIG. 7, the method may then end.

At block 708, if the movie positional configuration is the currently desired configuration, the display housing chassis may be rotated away from the base housing chassis via one or more hinges such that its plane is oriented at an angle between 270 and 320 degrees from the plane of the base housing chassis, with the keyboard facing down. For example, in an embodiment described with reference to FIG. 4B, the information handling system may be placed in a movie configuration by rotating the leading edge of the display housing chassis 412 away from the leading edge of the base housing chassis 410 by an angle between 270 degrees and 320 degrees. In other aspects the information handling system operating according to a movie configuration may be situated such that the keyboard portion of the base housing chassis is facing vertically down, and the glass sheet portion of the display housing chassis may be facing the user. For example, in an embodiment described with respect to FIG. 4B, the information handling system operating according to a movie configuration may be situated such that the keyboard portion (not shown) of the base housing chassis 404 may be facing vertically down, and the glass sheet 202 portion of the display housing chassis may be facing the user. Returning to FIG. 7, the method may then end.

At block 710, if the tent positional configuration is the currently desired configuration, the display housing chassis may be rotated away from the base housing chassis via one or more hinges such that its plane is oriented at an angle between 270 and 340 degrees from the plane of the base housing chassis with the leading edges of the display housing chassis and base housing chassis facing down. For example, in an embodiment described with reference to FIG. 4C, the information handling system may be placed in a tent configuration by rotating the leading edge of the display housing chassis 412 away from the leading edge of the base housing chassis 410 by an angle between 270 and 340 degrees. In other aspects the information handling system operating according to a tent configuration may be situated such that the leading edge of the base housing chassis and the leading edge of the display housing chassis are facing vertically down, and the glass sheet portion of the display housing chassis may be facing the user. For example, in an embodiment described with respect to FIG. 4C, the information handling system operating according to a tent configuration may be situated such that the leading edge of the base housing chassis 410 and the leading edge of the display housing chassis 412 are facing vertically down, and the glass sheet 202 portion of the display housing chassis may be facing the user. Returning to FIG. 7, the method may then end.

At block 712, if the tablet positional configuration is the currently desired configuration, the display housing chassis may be rotated away from the base housing chassis via one or more hinges such that its plane is oriented at an angle between 340 and 360 degrees from the plane of the base housing chassis. For example, in an embodiment described with reference to FIG. 4D, the information handling system may be placed in a tablet configuration by rotating the leading edge of the display housing chassis 412 away from the leading edge of the base housing chassis 410 when placed in a closed configuration by an angle between 340 and 360 degrees. In other aspects the information handling system operating according to a tablet configuration may be situated such that the keyboard portion of the base housing chassis is facing one direction, and the glass sheet portion of the display housing chassis may be facing the opposite direction. For example, in an embodiment described with respect to FIG. 4D, the information handling system operating according to a tablet configuration may be situated such that the keyboard portion (not shown) of the base housing chassis may be facing vertically down, and the glass sheet 202 portion of the display housing chassis may be facing the opposite direction, or vertically up. Returning to FIG. 7, the method may then end.

Figure 8:
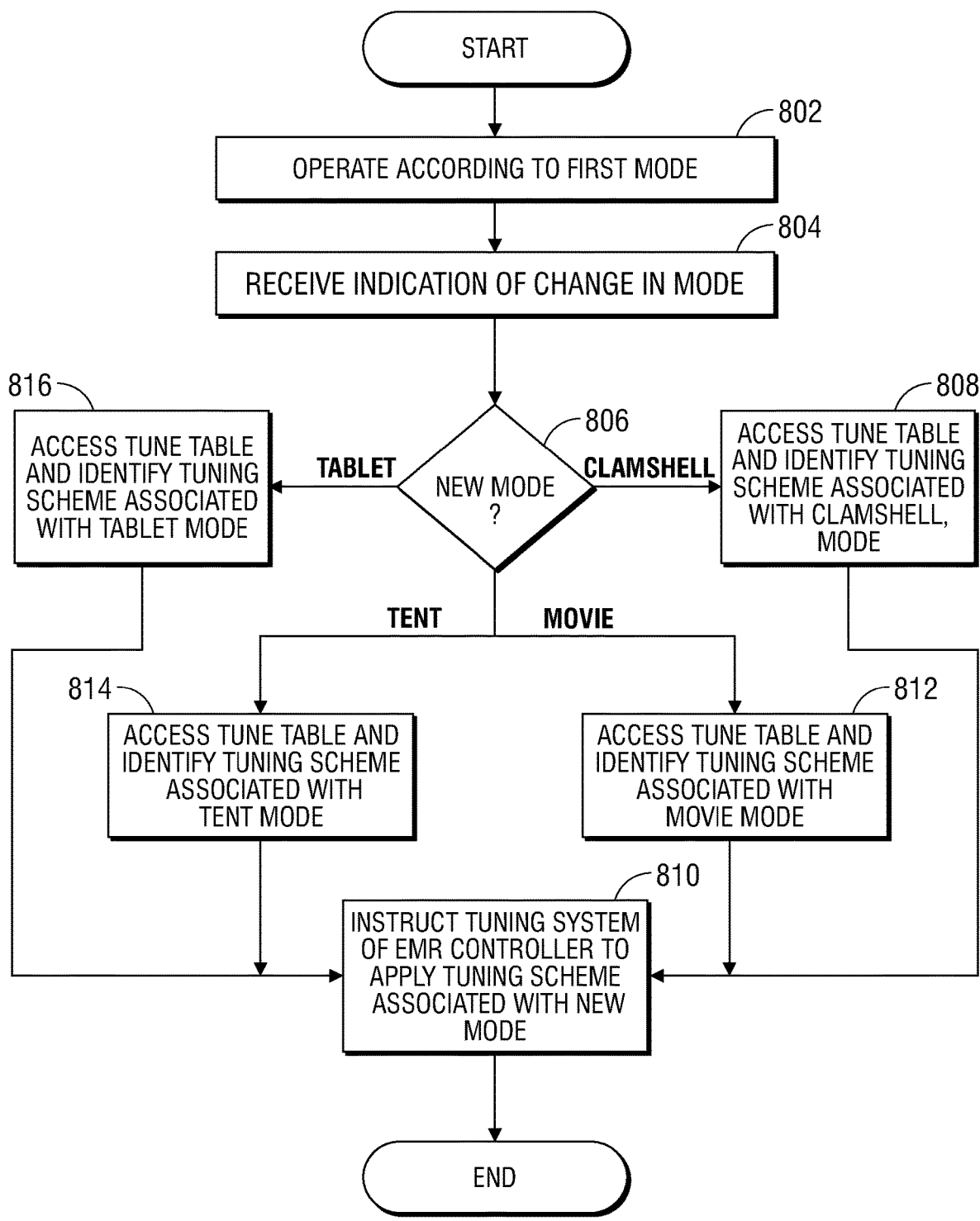
FIG. 8 is a block diagram illustrating a method of tuning a current based on a current positional configuration of an information handling system according to an embodiment of the present disclosure.

FIG. 8 is a block diagram illustrating a method of tuning a current supplied to an EMR digitizer sheet in order to generate an EM field based on a current positional configuration of an information handling system according to an embodiment of the present disclosure. At block 802, in an embodiment, an information handling system may be operating according to a first mode or first positional configuration. As described herein, rotation of the display housing chassis with respect to the base housing chassis in embodiments of the present disclosure may cause the information handling system to operate in a plurality of positional configurations, including but not limited to a closed, clamshell, movie, tent, and tablet mode. The information handling system in an embodiment may be rotated from a first positional configuration including any known configuration (e.g. closed, clamshell, movie, tent, and tablet) to a second positional configuration also including any known configuration (e.g. closed, clamshell, movie, tent, and tablet).

At block 804, in an embodiment, the EMR controller executing code instructions of an EMR digitizer tuning system may receive an indication of a change in mode or positional configuration of the information handling system. As described herein, the information handling system may include a sensor hub, which may be operably connected to the EMR controller. For example, in an embodiment described with reference to FIG. 1, the information handling system 100 may include a sensor hub 114, which may be operably connected to an EMR controller 116 via a bus 108. In such an embodiment, the sensor hub 114 may operate to detect a current positional configuration or change in the positional configuration of the information handling system 100. Sensor hub 114 may include a rotation sensor capable of determining the degree of rotation between the information handling system display housing chassis and base housing chassis, such as for example, a giant magneto-resistive (GMR) rotation sensor. By detecting the degree of rotation, the sensor hub 114 may identify the positional configuration of the information handling system, as described herein. The sensor hub 114 may then transmit an indication of the current positional configuration or a change in positional configuration of the information handling system 100 to the EMR controller 116.

Returning to FIG. 8, upon receipt of an indication of a change in positional configuration of the information handling system in an embodiment, at block 806, the EMR controller may determine the current operational configuration or mode of the information handling system. The EMR controller in an embodiment may operate to tune a current supplied to the EMR digitizer sheet in order to decrease deleterious effects of interference between one or more magnets housed in the display housing chassis and base housing chassis according to code instructions of the EMR digitizer tuning system. As described herein, the interference acting upon the EMR digitizer sheet may depend upon the distance between the one or more magnets and the EMR digitizer sheet, which may vary as the information handling system moves from one positional configuration to another. As such, the controller may optimize tuning of the current supplied to the EMR digitizer sheet by employing a tuning scheme predetermined to decrease interference most optimally for the current known distances between the one or more magnets and the EMR digitizer sheet. These current known distances in an embodiment may be correlated to the current positional configuration identified by the sensor hub at block 804. Once the current positional configuration is known, the controller in an embodiment may then identify the tuning scheme predetermined to decrease interference most optimally when the information handling system is operating according to that current positional configuration. If the current positional configuration is the clamshell configuration, the method may proceed to block 808. If the current positional configuration is the movie configuration, the method may proceed to block 812. If the current positional configuration is the tent configuration, the method may proceed to block 814. If the current positional configuration is the tablet configuration, the method may proceed to block 816.

At block 808, if the current positional configuration is the clamshell configuration, the controller in an embodiment may access a tune table and identify a tuning scheme associated with a clamshell mode. A tune table in an embodiment may be stored in a memory of the EMR digitizer tuning system, or within a main memory of the information handling system. The tune table may associate the clamshell mode with a tuning scheme predetermined to optimally tune the current supplied to the EMR digitizer sheet based on interference of magnets known to be located sufficiently close to the EMR digitizer sheet while the information handling system is in the clamshell configuration in order to cause interference. For example, in an embodiment described with reference to FIG. 5, the display housing magnet 306 in an embodiment may be situated a distance $Y_1$ (measured in millimeters) away from the EMR digitizer sheet 118 known to be short enough such that the display housing magnet 306 will cause interference with the EMR digitizer sheet 118 when the information handling system is operating in a clamshell mode. As another example, the GMR magnet may be situated a fixed distance away from the EMR digitizer sheet 118 known to be short enough such that the GMR magnet will cause interference with the EMR digitizer sheet 118 when the information handling system is operating in a clamshell mode.

Returning to FIG. 8, at block 810 in an embodiment, the controller may execute code instructions of the EMR digitizer tuning system to instruct a tuning system of the EMR controller to apply the tuning scheme associated with the current positional configuration in the tuning table. The EMR digitizer tuning system in such an embodiment may apply a tuning scheme by, for example, tuning the current delivered to specific regions of the X and Y coils of the digitizer sheet located closest to a magnet known to be in close proximity to the digitizer sheet in the current configuration of the information handling system. In other embodiments, the EMR digitizer sheet may include a plurality of sets of X and Y coils, with some sets of X and Y coils known to be located in close proximity to one or more magnets in an information handling system operating according to the current configuration. In such embodiments, the EMR digitizer tuning system may apply the tuning scheme by, for example, tuning the current delivered to the set of X and Y coils known to be located in close proximity to one or more of these magnets differently than the current delivered to other sets of X and Y coils not known to be located in close proximity to those magnets when the positional configuration in which the information handling system is operating is determined. Tuning of current supplied to one or more sets of X and Y coils of the EMR digitizer sheet 118 in embodiments may include tuning one or more currents to different frequencies, greater amplitudes, or operating one or more currents in a repeated pulse.

As described herein, the portion of the EMR digitizer sheet in which interference from closely situated magnets is expected to occur varies with the positional configuration of the information handling system. For example, in an embodiment described with reference to FIG. 5, when the information handling system is operating in a clamshell mode, the portion of the EMR digitizer sheet 118 situated closest to the display housing magnet 306 and to the GMR magnet may be the portion of the EMR digitizer sheet in which interference from closely situated magnets is expected to occur. As such, the tuning scheme associated with the clamshell mode and applied by the controller at block 810 may include instructions to tune the AC current supplied to the portions of the X and Y coils of the digitizer sheet located nearest to the display housing magnet and GMR magnet in order to overcome the expected interference. In other embodiments, the digitizer sheet may include a plurality of sets of X and Y coils, with one or more sets of the X and Y coils being situated in closer proximity to the display housing magnet and/or GMR magnet than others. In such an embodiment, the tuning scheme associated with the clamshell mode and applied by the controller at block 810 may include instructions to tune the AC current supplied to the one or more sets of X and Y coils known to be situated in close proximity to the display housing magnet differently than the AC current supplied to the one or more sets of X and Y coils not known to be situated in close proximity to the display housing magnet and/or the GMR magnet.

In another aspect, as described herein, because the display housing magnet 306, GMR magnet, and the EMR digitizer sheet 118 in an embodiment may all be located within the display housing chassis 402, the distance $Y_1$ between the display housing magnet 306 and the EMR digitizer sheet 118, and the distance between the GMR magnet and the EMR digitizer sheet 118 may not vary as the display housing chassis 402 rotates with respect to the base housing chassis, the EMR controller in an embodiment may execute instructions of the EMR digitizer tuning system to tune the current supplied to the EMR digitizer sheet to account for interference caused by the display housing magnet 306 and the GMR magnet when the information handling system is placed in all positional configurations, including but not limited to the clamshell, movie, tent, and tablet configurations.

This is only one example of a tuning scheme applied to tune the current supplied to the EMR digitizer sheet in an embodiment. Each positional configuration may be associated with a different tuning scheme in an embodiment. In other embodiments, a default tuning scheme such as for example, the tuning scheme described directly above with respect to the clamshell configuration may be associated with multiple positional configurations (e.g. clamshell, movie, and tent). In such other embodiments, a tablet positional configuration may be associated with only the tablet mode, and when operating in any other positional configuration, the default tuning scheme may be applied. In yet other aspects, a plurality of portions of the EMR digitizer sheet may undergo different tuning schemes based on known proximities of a plurality of magnets to the EMR digitizer sheet, as described below with reference to the tablet configuration.

At block 812, if the current positional configuration is the movie configuration, the EMR controller executing code instructions of the EMR digitizer tuning system may access the tune table and identify the tuning scheme associated with the movie mode. As described herein, the portion of the EMR digitizer sheet in which interference is expected to occur varies with the positional configuration of the information handling system. For example, in an embodiment described with reference to FIG. 6, when the information handling system is operating in a movie mode, the distances $Z_1$ and $Z_2$ as measured while the information handling is placed in a movie configuration may be sufficiently small such that neither the base magnet 308 nor speaker magnet 304 may cause interference to the EM field generated by the EM digitizer sheet 118.

When the information handling system is placed in a movie configuration known to place neither the base magnet 308 nor the speaker magnet 304 close enough to the EM digitizer sheet 118 in order to cause interference, the EMR digitizer tuning system in an embodiment may associate the movie mode with a tuning scheme operating to decrease interference caused by only the display housing magnet 306, and/or other magnets having a fixed position close enough to the EMR digitizer sheet 118 to cause interference, regardless of the positional configuration of the information handling system. These are only example embodiments, and the identification and number of magnets capable of causing interference to the EM field generated by the EMR digitizer sheet 118 while the information handling system is placed in movie mode may vary in other embodiments. For example, in some embodiments, the movie mode may optionally be associated with peripheral devices that may include magnets that may cause interference, such as external speakers placed on either side of the display screen. In such an embodiment, the tuning scheme associated with the movie mode may operate to decrease interference caused by magnets within such peripheral speakers. As another example, the tuning scheme associated with a movie mode in some embodiments may be a default tuning scheme also associated with the tent mode and clamshell mode.

The method may then move to block 810 where the controller applies the tuning scheme associated with the movie mode. For example, the tuning scheme associated with the movie mode and applied by the controller at block 810 may include instructions to tune the AC current supplied to the portions of the X and Y coils of the digitizer sheet located nearest to the display housing magnet and/or GMR magnet in order to overcome the expected interference. In other embodiments, the digitizer sheet may include a plurality of sets of X and Y coils, with one or more sets of the X and Y coils being situated in closer proximity to the display housing magnet and/or GMR magnet than others. In such an embodiment, the tuning scheme associated with the movie mode and applied by the controller at block 810 may include instructions to tune the AC current supplied to the one or more sets of X and Y coils known to be situated in close proximity to the display housing magnet and/or GMR magnet differently than the AC current supplied to the one or more sets of X and Y coils not known to be situated in close proximity to the display housing magnet and/or GMR magnet.

At block 814, if the current positional configuration is the tent configuration, the EMR controller executing code instructions of the EMR digitizer tuning system may access the tune table and identify the tuning scheme associated with the tent mode. As described herein, the portion of the EMR digitizer sheet in which interference is expected to occur varies with the positional configuration of the information handling system. For example, in an embodiment described with reference to FIG. 6, the distance $Z_1$ as measured while the information handling is placed in a tent configuration may be sufficiently great such that the base magnet 308 may not cause interference to the EM field generated by the EM digitizer sheet 118, but the distance $Z_2$ in the same configuration may be sufficiently small such that the speaker magnet 304 does cause interference to the EM field generated by the EM digitizer sheet 118.

When the information handling system is placed in a tent configuration known to place the speaker magnet 304 close enough to the EM digitizer sheet 118 in order to cause interference, but not to place the base magnet 308 close enough to cause interference, the EMR digitizer tuning system in an embodiment may associate the tent mode with a tuning scheme operating to decrease interference caused by the speaker magnet 304, and the display housing magnet 306. These are only example embodiments, and the identification and number of magnets capable of causing interference to the EM field generated by the EMR digitizer sheet 118 while the information handling system is placed in tent mode may vary in other embodiments. For example, the tuning scheme associated with a tent mode in some embodiments may be a default tuning scheme also associated with the movie mode and clamshell mode.

The method may then move to block 810 where the controller applies the tuning scheme associated with the tent mode. For example, the tuning scheme associated with the tent mode and applied by the controller at block 810 may include instructions to tune the AC current supplied to the portions of the X and Y coils of the digitizer sheet located nearest to the display housing magnet, the GMR magnet, and the speaker magnet in order to overcome the expected interference. In other embodiments, the digitizer sheet may include a plurality of sets of X and Y coils, with one or more sets of the X and Y coils being situated in closer proximity to the display housing magnet, GMR magnet, and/or the speaker magnet than others. In such an embodiment, the tuning scheme associated with the tent mode and applied by the controller at block 810 may include instructions to tune the AC current supplied to the one or more sets of X and Y coils known to be situated in close proximity to the display housing magnet and the speaker magnet differently than the AC current supplied to the one or more sets of X and Y coils not known to be situated in close proximity to the display housing magnet, GMR magnet, or speaker magnet.

At block 816, if the current positional configuration is the tablet configuration, the EMR controller executing code instructions of the EMR digitizer tuning system may access the tune table and identify the tuning scheme associated with the tablet mode. As described herein, the portion of the EMR digitizer sheet in which interference is expected to occur varies with the positional configuration of the information handling system. For example, in an embodiment described with reference to FIG. 6, the distances $Z_1$ and $Z_2$ as measured while the information handling is placed in a tablet configuration, may be sufficiently small such that both the base magnet 308 and speaker magnet 304 may cause interference to the EM field generated by the EM digitizer sheet 118.

When the information handling system is placed in a tablet configuration known to place the base magnet 308 and the speaker magnet 304 close enough to the EM digitizer sheet 118 in order to cause interference, the EMR digitizer tuning system in an embodiment may associate the tablet mode with a tuning scheme operating to decrease interference caused by the speaker magnet 304, GMR magnet (not shown), the base magnet 308, and the display housing magnet 306. These are only example embodiments, and the identification and number of magnets capable of causing interference to the EM field generated by the EMR digitizer sheet 118 while the information handling system is placed in tablet mode may vary in other embodiments. The method may then move to block 810 where the controller applies the tuning scheme associated with the tablet mode. For example, the tuning scheme associated with the tablet mode and applied by the controller at block 810 may include instructions to tune the AC current supplied to the portions of the X and Y coils of the digitizer sheet located nearest to the display housing magnet, the GMR magnet, the speaker magnet, and/or the base magnet in order to overcome the expected interference. In other embodiments, the digitizer sheet may include a plurality of sets of X and Y coils, with one or more sets of the X and Y coils being situated in closer proximity to the display housing magnet, GMR magnet, speaker magnet, and/or base magnet than others. In such an embodiment, the tuning scheme associated with the tablet mode and applied by the controller at block 810 may include instructions to tune the AC current supplied to the one or more sets of X and Y coils known to be situated in close proximity to the display housing magnet, GMR magnet, speaker magnet, and/or base magnet differently than the AC current supplied to the one or more sets of X and Y coils not known to be situated in close proximity to the display housing magnet, speaker magnet, or base magnet. In such a way, the EMR digitizer tuning system in an embodiment may tune the current supplied to the EMR digitizer sheet in order to decrease deleterious effects of interference from nearby magnets based on a plurality of positional configuration of the information handling system, while maintaining a slim, lightweight and versatile information handling system chassis.

The blocks of the flow diagrams of FIGS. 7-8 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operable to transition between a plurality of positional configurations comprising:
   a central processing unit and a digital display device;
   the display housing chassis housing the digital display and an electromagnetic resonance (EMR) digitizer operably connected to a controller;
   the EMR digitizer generating an electromagnetic radiation field tuned to detect input from an EMR pen, where the tuning reduces effects from at least one operational magnet of a non-digitizer system of the information handling system on the EMR digitizer;
   the base housing chassis operably connected to a display housing chassis via a hinge and moveable with respect to one another around the hinge according to a plurality of positional configurations;
   the controller executing code instructions of the EMR digitizer tuning system to:
      receive an indication from a sensor hub operably connected to the controller of a change in positional configuration to a first positional configuration;
      associate the first positional configuration with a first EMR sheet tuning configuration stored in a memory operably connected to the controller tuned for the first positional configuration; and
      instruct a tuning network operably connected to the EMR digitizer to tune the EMR sheet electromagnetic radiation field to the first EMR sheet tuning configuration.

2. The information handling system of claim 1 further comprising:
   the controller executing code instructions of the EMR digitizer tuning system to:
      receive an indication from the sensor hub operably connected to the controller of a change in positional configuration to a second positional configuration;
      associate the second positional configuration with a second EMR sheet tuning configuration tuned for the second positional configuration; and
   instruct the tuning network operably connected to the EMR digitizer to tune the EMR sheet electromagnetic radiation field to the second EMR sheet tuning configuration.

3. The information handling system of claim 2 wherein the second tuning configuration is a default tuning configuration of the EMR digitizer.

4. The information handling system of claim 2 further comprising:
   the controller executing code instructions of the EMR digitizer tuning system to:
      receive an indication from the sensor hub operably connected to the controller of a change in positional configuration to a third positional configuration;
      associate the third positional configuration with a third EMR sheet tuning configuration tuned for the third positional configuration.

5. The information handling system of claim 1 wherein the first tuning configuration is determined to reduce the effects of the at least one operational magnet of the information handling system based on the proximity of that at least one magnet to a portion of the EMR digitizer.

6. The information handling system of claim 1 wherein a proximity of the EMR digitizer to the at least one operational magnet of the information handling system varies based on the change in positional configuration.

7. The information handling system of claim 1 wherein the at least one operational magnet of the information handling system is housed in the base housing chassis and includes one of a speaker magnet, a base magnet, a hall effect magnet, or an angle sensor magnet.

8. A method of tuning an electromagnetic radiation field based on positional configurations of an information handling system comprising:
generating an electromagnetic radiation field tuned to detect input from an electromagnetic resonance (EMR) pen via an electromagnetic resonance (EMR) digitizer, where the tuning reduces effects from at least one operational magnet of a non-digitizer system of the information handling system on the EMR digitizer;
receiving an indication from a sensor hub operably connected to a controller of a change in a positional configuration to a first positional configuration;
wherein the first positional configuration is one of a plurality of positional configurations defining a degree of rotation of a display housing chassis with respect to a base housing chassis;
associating the first positional configuration with a first EMR sheet tuning configuration stored in a memory operably connected to the controller tuned for the first positional configuration; and
instructing a tuning network operably connected to the EMR digitizer to tune an EMR digitizer electromagnetic radiation field to the first EMR sheet tuning configuration.

9. The method of claim 8 further comprising:
receiving an indication from the sensor hub operably connected to the controller of a change in positional configuration to a second positional configuration;
associating the second positional configuration with a second EMR sheet tuning configuration tuned for the second positional configuration; and
instructing the tuning network operably connected to the EMR digitizer to tune the EMR sheet electromagnetic radiation field to the second EMR sheet tuning configuration.

10. The method of claim 9 further comprising:
receiving an indication from the sensor hub operably connected to the controller of a change in positional configuration to a third positional configuration;
associating the third positional configuration with a third EMR sheet tuning configuration tuned for the third positional configuration.

11. The method of claim 8 wherein the first tuning configuration is determined to reduce the effects of the at least one operational magnet of the information handling system based on the proximity of that at least one magnet to a portion of the EMR digitizer.

12. The method of claim 8 wherein the at least one operational magnet of the information handling system is housed in the base housing chassis and includes one of a speaker magnet, a base magnet, a hall effect magnet, or an angle sensor magnet.

13. The method of claim 8 wherein the plurality of positional configurations includes a movie configuration such that the display housing chassis is oriented in a plane at an angle between 270 and 320 degrees from a plane of the base housing chassis with a display facing a user.

14. The method of claim 8 wherein the plurality of positional configurations includes a tent configuration such that the display housing chassis is oriented in a plane at an angle between 270 and 320 degrees from a plane of the base housing chassis with a display facing a user and leading edges facing down.

15. An information handling system operable to transition between a plurality of positional configurations comprising:
a central processing unit and a digital display device;
the display housing chassis housing the digital display and an electromagnetic resonance (EMR) digitizer operably connected to a controller;
the EMR digitizer generating an electromagnetic radiation field tuned to detect input from an electromagnetic EMR pen, where the tuning reduces effects from at least one operational magnet of a non-digitizer system of the information handling system on the EMR digitizer;
the base housing chassis operably connected to a display housing chassis via a hinge and moveable with respect to one another around the hinge according to a plurality of positional configurations;
the controller executing code instructions of the EMR digitizer tuning system to:
receive an indication from a sensor hub operably connected to the controller of a change in positional configuration to a first positional configuration;
wherein a proximity of the EMR digitizer to the at least one operational magnet of the information handling system varies based on the change in positional configuration;
associate the first positional configuration with a first EMR sheet tuning configuration stored in a memory operably connected to the controller tuned for the first positional configuration; and
instruct a tuning network operably connected to the EMR digitizer to tune the EMR sheet electromagnetic radiation field to the first EMR sheet tuning configuration.

16. The information handling system of claim 15 further comprising:
the controller executing code instructions of the EMR digitizer tuning system to:
receive an indication from the sensor hub operably connected to the controller of a change in positional configuration to a second positional configuration;
associate the second positional configuration with a second EMR sheet tuning configuration tuned for the second positional configuration; and
instruct the tuning network operably connected to the EMR digitizer to tune the EMR sheet electromagnetic radiation field to the second EMR sheet tuning configuration.

17. The information handling system of claim 16 wherein the second tuning configuration is a default tuning configuration of the EMR digitizer.

18. The information handling system of claim 16 further comprising:
the controller executing code instructions of the EMR digitizer tuning system to:
receive an indication from the sensor hub operably connected to the controller of a change in positional configuration to a third positional configuration;
associate the third positional configuration with a third EMR sheet tuning configuration tuned for the third positional configuration.

19. The information handling system of claim 15 wherein the plurality of positional configurations includes a tablet configuration such that the display housing chassis is oriented in a plane at an angle between 340 and 360 degrees from a plane of the base housing chassis with a display facing a user.

20. The information handling system of claim 15 wherein the plurality of positional configurations includes a clamshell configuration such that the display housing chassis is oriented in a plane at an angle between 10 and 1800 degrees from a plane of the base housing chassis with a keyboard facing upward.

* * * * *